L. Dodge.
Making Axes.
No. 2,084. Reissued Oct. 10, 1865.
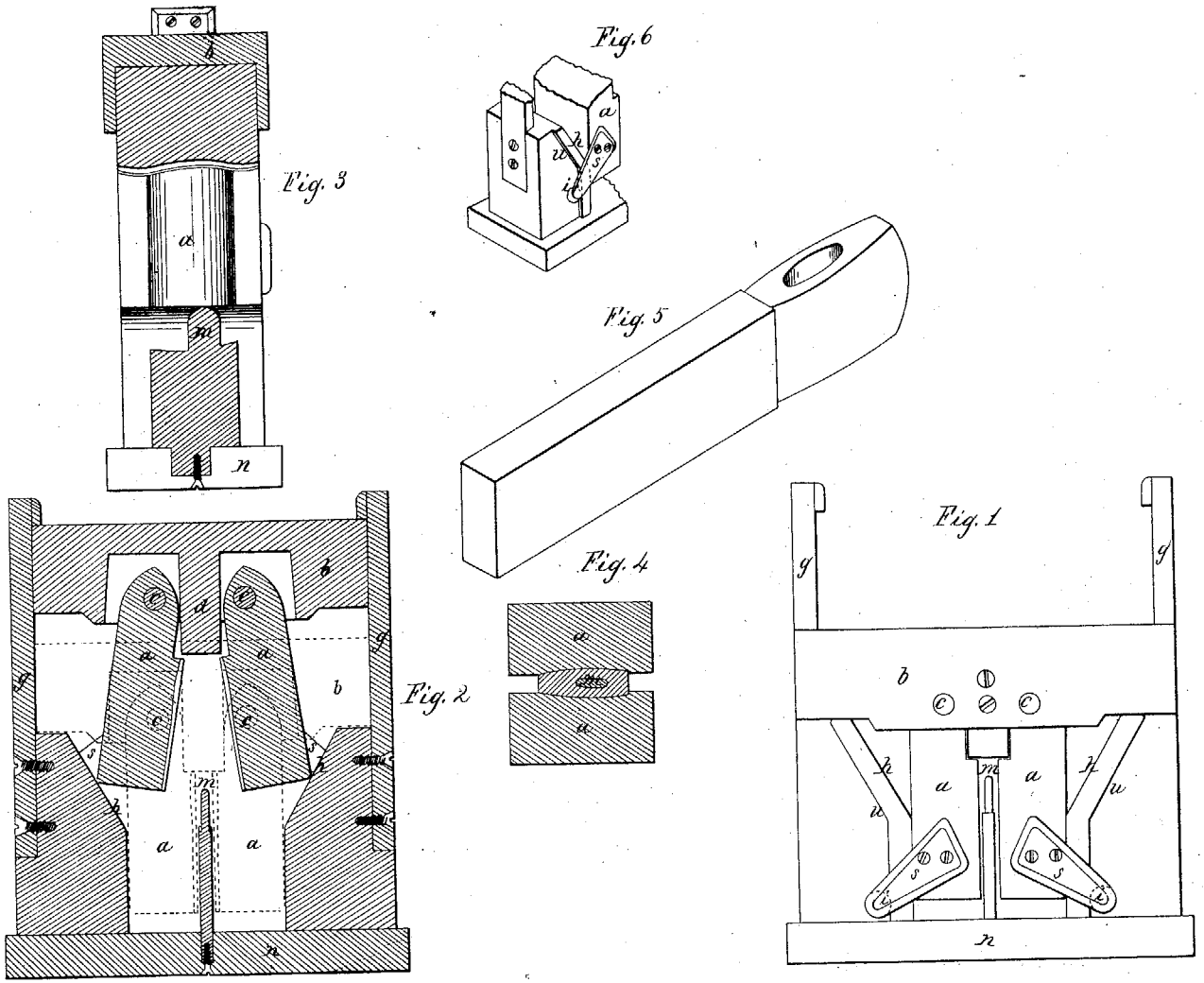
Witnesses
Chas. E. Sloyd
Wm. H. Harrison
Inventor
Levi Dodge
by his atty
Chas. Page
THE GRAPHIC CO. PHOTO-LITH. 39 & 41 PARK PLACE, N.Y.

UNITED STATES PATENT OFFICE.

LEVI DODGE, OF WATERFORD, NEW YORK.

IMPROVEMENT IN FORMING AND PUNCHING ARTICLES OF IRREGULAR FORM.

Specification forming part of Letters Patent No. 31,660, dated March 12, 1861; Reissue No. 2,084, dated October 10, 1865.

*To all whom it may concern:*

Be it known that I, LEVI DODGE, of Waterford, in the county of Saratoga and State of New York, have invented an Improvement in the Manufacture of Axes, Hatchets, and other Articles of Iron which in the Process of Manufacture Require to be Punched; and I hereby declare that the following is a full, clear, and exact descrlption of the principle or character of the same, and which distinguishes it from all other things before known, and of the usual manner of making, modifying, and using the same, reference being had to the accompanying drawings, of which—

Figure 1 is an elevation of the matrices or dies closed; Fig. 2, a longitudinal section showing in red lines the dies closed and in black lines open; Fig. 3, a cross-section through the middle of the machine between the dies. Fig. 4 is a cross-section through the dies and ax-head, and Fig. 5 a bar of iron with an ax-head formed previous to its being cut off. Fig. 6 is a detached view showing the devices for opening the dies.

My invention relates to the punching of articles which in the process of manufacture are perforated for the insertion of handles or for other purposes; and it consists in holding the article while being punched in suitable dies or matrices in the manner substantially as hereinafter described.

For illustration of the practical working of the invention I will here represent the matrices or dies for forming ax or hatchet heads and the punch adapted to punching the eyes within the matrices.

*a a* in the said figures are the forming matrices pivoted to the head-block *b* at *c c*, and between the matrices is fixed a bed-piece, *d*, which is embraced by the recessed ends of the matrices as they close upon the bar of metal used to form the ax-poll. The cross-head is made so as to slide up and down upon the upright guides *g g*. The lower ends of the matrices *a a* move over inclined planes *h h* on the pillar-block, which causes the matrices to close upon the metal as the head-block descends. *m* is a punch, fixed to the base-block *n*, for punching out the eye of the ax-poll while it is confined in the matrices, the punching being done while the closed matrices descend between the parallel sides of the pillar-blocks. The arms *s s*, attached to the matrices, are furnished with projections or cam-pieces, *i*, which, acting against the ridges *u u* on the pillar-blocks, draw the matrices apart as the head-block rises. The above illustrates the punching of ax-polls while in their matrices, but the same principles of construction and operation will hold for other articles which require to be punched.

The advantages due to this mode of punching articles of iron will be apparent when it be considered that it is applicable to the punching of articles of whatever form, whether of plane or of curved surfaces or of regular or irregular forms, so-called—that is, forms having flat or convex or concave external surfaces. By this invention the punching is effected while the parts of the article to be punched are confined within the matrices and during the process of formation; or it may be punched in the same or similar matrices subsequent to the formation. Particularly is this invention indispensable for the punching of holes of articles of irregular or swelled or bulging form, inasmuch as the dies or matrices are of a corresponding irregular, swelled, or bulging form, into which the articles formed or to be formed cannot be thrust, and yet attain simultaneous action upon all and the several sides thereof, to prevent the spreading and splitting of the metal, as is the case when regular-shaped articles—that is, articles of flat surfaces—and corresponding matrices are used.

I am aware that articles have been punched while being formed by an outside punch—that is, by a punch acting on the portion of the article not inclosed within and between the formers or shaping-dies. The latter combination of formers or shaping-dies with an outside punch was patented to me on the 1st day of September, 1857, to which, of course, I lay no claim under the present patent. But few articles, and only such, the hole to be punched of which was as compared to the bulk of the article very small, could with advantage be formed and punched simultaneously by means of a machine combining an outside punch with the formers.

Having thus described my invention, what

I claim as my improvement in the manufacture of axes and other articles of iron is—

1. Punching the same when the part to be punched is inclosed in conforming dies made to open and close in the manner herein set forth.

2. The combination of a punch with swinging matrices constructed and arranged relatively to each other substantially as herein shown and described.

3. In combination with a punch and movable dies for punching and shaping articles of iron by their simultaneous action or pressure on the sides of said articles, as described, the employment of cams, or the equivalents, thereof to actuate automatically the dies to open and close, substantially in the manner and for the purpose set forth.

In testimony whereof I have signed my name to this specification before two subscribing witnesses.

LEVI DODGE.

Witnesses:
JOHN A. WALDRON,
C. A. WALDRON.